H. C. FORD & H. L. TANNER.
GYROSCOPIC COMPASS AND METHOD OF CONTROLLING THE SAME.
APPLICATION FILED MAR. 7, 1914.

1,273,799.

Patented July 23, 1918.
3 SHEETS—SHEET 1.

Witnesses:
Frederick C. Narveson
Albert W. Stingham

Hannibal C. Ford
Harry L. Tanner
Inventors

By Edmund B. Whitcomb
Attorney

H. C. FORD & H. L. TANNER.
GYROSCOPIC COMPASS AND METHOD OF CONTROLLING THE SAME.
APPLICATION FILED MAR. 7, 1914.

1,273,799.

Patented July 23, 1918.

WITNESSES:
Frederick C. Nguesen
Albert W. Stringham

Hannibal C. Ford INVENTORS
Harry L. Tanner

BY
Edmund B. Whitcomb
ATTORNEY

UNITED STATES PATENT OFFICE.

HANNIBAL C. FORD, OF JAMAICA, AND HARRY L. TANNER, OF BROOKLYN, NEW YORK, ASSIGNORS TO THE SPERRY GYROSCOPE COMPANY, OF BROOKLYN, NEW YORK.

GYROSCOPIC COMPASS AND METHOD OF CONTROLLING THE SAME.

1,273,799. Specification of Letters Patent. Patented July 23, 1918.

Application filed March 7, 1914. Serial No. 823,269.

*To all whom it may concern:*

Be it known that we, HANNIBAL C. FORD and HARRY L. TANNER, citizens of the United States, residing at Jamaica, Queens county, New York State, and Brooklyn, in the county of Kings and State of New York, have invented certain new and useful Improvements in Gyroscopic Compasses and Methods of Controlling the Same, of which the following is a specification.

This invention relates to gyroscopic compasses and has for its object to provide a simple, practical gyro-compass of large directive power especially suited for the navigation of ships or similar moving vehicles.

Furthermore, this invention consists in safe-guarding the operation of the gyro-compass against disturbances such as oscillations, acceleration pressures, motions, etc., received from the ship, by providing such compass with suitable damping, ballistic and correction factors.

Further objects of this invention consist in eliminating certain disturbances in gyro-compass readings which result from the introduction of vibrations or oscillations from extraneous sources which are set up in planes or about axes which are neither Cardan nor approximately Cardan in their position relative to the compass. It has been proposed to eliminate such disturbing influences by stabilizing or steadying the gyroscopic apparatus as a whole in the east-west plane as well as in the north-south plane, and (some workers have even gone so far as) to stabilize the whole gyroscopic apparatus including the suspension of the movable system.

These results have been sought to be accomplished by the introduction of extra gyroscopic stabilizers, consisting in one or more extra gyros variously arranged with reference to the compass for steadying the apparatus as a whole, or the part of the gyro-compass known as the movable, or sensitive system.

As is well known in the art, a gyro-compass to be operative must be possessed of a predetermined ballistic component of very large magnitude. The stabilizing of the pendulous mass representing so large a ballistic factor becomes a serious and difficult matter and requires the introduction of large extra gyroscopes.

It is still more difficult when attempt is made to stabilize the entire apparatus including the support of the compass or even its movable system, because here additional inertia moments are present to be steadied and controlled.

The practical outcome of these attempts is that when these methods are applied to compasses of high directive power the apparatus as a whole is rendered so cumbersome and complex as to make it thoroughly impracticable.

It is with gyro-compasses of large directive power that the present application especially deals, although the method and apparatus described herein are, of course, equally applicable to all gyro-compasses.

The extra amount of energy required to carry out our method is about 1/25th of that heretofore used in compasses which employ any of the methods heretofore proposed, and wherein, as above stated, only two-thirds of the necessary transverse stability was secured; whereas the present device yields an effective stabilization 50% in excess of the above figures, or in other words practically perfect and equally effective stabilization in both planes without actually stabilizing the compass in the east-west plane at all. The latter consideration is most valuable as it leaves all parts free to take up their natural positions in swinging from their supporting center, and also leaving the sensitive element free and unhampered as to the magnitude of its ballistic properties about its support or about Cardan's point so that any desired ballistic about this point may be employed. This result is attained through the fact that by our method we are required to stabilize only an imaginary line or point, instead of large pendulous masses.

Referring now to the accompanying drawings, in which the same reference numerals indicate like parts throughout, Figure 1 is an elevation, partly in section, of a compass embodying our invention;

Fig. 2 is a side elevation, partly in section, with parts broken away and others omitted to show the construction;

Fig. 2ª is an enlarged sectional view of the connection of the arm 20 to the casing 10;

Fig. 13 is a detail showing the eccentric mounting of the bail 12 in each of the views;

In carrying out this invention the fact is utilized that the ballistic factor in whole or in part which keeps the plane of the spinning mass of the compass closely to the vertical may be free from the wheel casing and connected to it by an element which may move in reference to either one or both, that is, to either the member imparting ballistic properties to the gyro, or to the wheel casing itself, or to both of said parts. The direction of this motion is preferably in the plane of the spin of the wheel and means are utilized for preventing oscillations and for controlling the position of this point of contact with regard to any desired point of reference.

The mechanical element or structure for developing this ballistic property may be supported in various ways. Two methods have been selected to illustrate this feature, one where the support is on a part independent of the sensitive element, as in the gyro-compass shown in the prior application of E. A. Sperry, No. 634,594, and the other where it is supported in more close relation to this element.

Figures 5, 6, 7, 8, 9, 10, 11, 12:
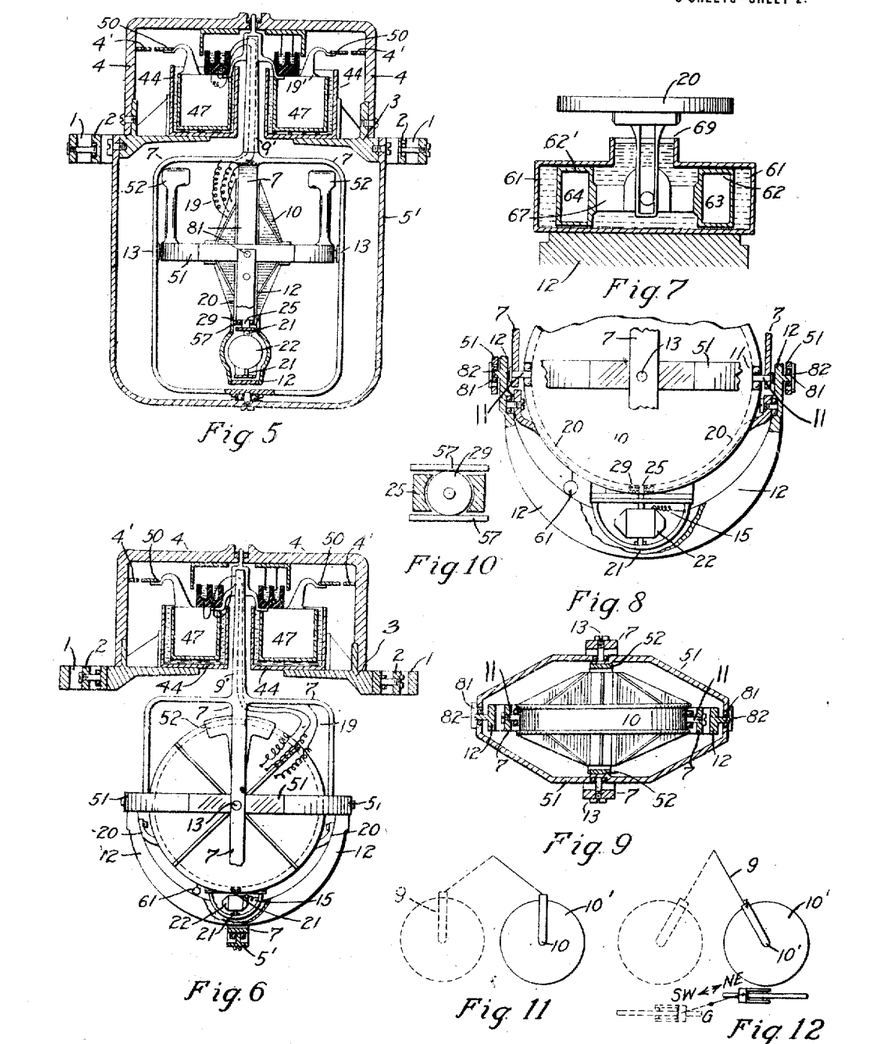
Fig. 5 is an elevation, partly in section, of a slightly modified form of the invention.
Fig. 6 is a similar view taken at right angles thereto.
Fig. 7 is a sectional view of the dash pot forming a part of this invention.
Fig. 8 is an elevation, partly in section, showing one form of connecting the pendulum 12 to the casing 10 and the mounting of the pendulum 12.
Fig. 9 is a detail view.
Fig. 10 is a section, showing the method of supporting the parts in Figs. 5 and 6.
Figs. 11 and 12 are diagrammatic views showing the principle and result produced by our invention.
Figure 14:
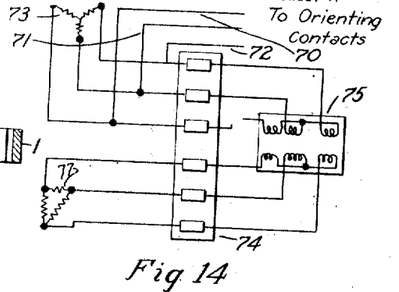
Fig. 14 is a diagram of the electrical connections.

For better understanding of what our invention accomplishes, reference is made to Figs. 11 and 12; in these figures the compass wheel is represented by a disk 10', rotating in bearings in a frame 10, which in turn is suspended by a flexible cord 9.

Fig. 11 illustrates how the gyro-compass acts when attempt is made, according to previous methods, to eliminate azimuth disturbances due to acceleration forces (movement of ship, etc.,) and gravity by supplemental gyros as above pointed out. Here the gyro wheel 10' and frame 10 are held vertically during the swing of the gyro due to these forces.

However, in Fig. 12 is illustrated the result produced with our invention. It will be noted that in this figure the wheel and frame when swung out are in a continuous line with suspending cord 9 when shown in north or south elevation and thus the compass is left free and natural and its usefulness is increased. We accomplish this result by simply holding the point of application of the pendulous element directly below the gravity center barring damping offset when used throughout oscillations, or in other words holding a point of attachment between the gyro and pendulous element so that it always bears a fixed relation to the vertical plane through the spinning axis of the rotor or other fixed point on the gyroscope approximately in line with pivots 11—11.

Referring to the drawings, 1 represents a binnacle or support for the compass; 2 the usual Cardan ring and 3 a supporting frame which is pivoted thereto at 3'. The arms or fins 35 of the frame 3 support a bearing 4 for the stem 6 of the phantom ring 5.

Figures 1, 2, 2A, 13:
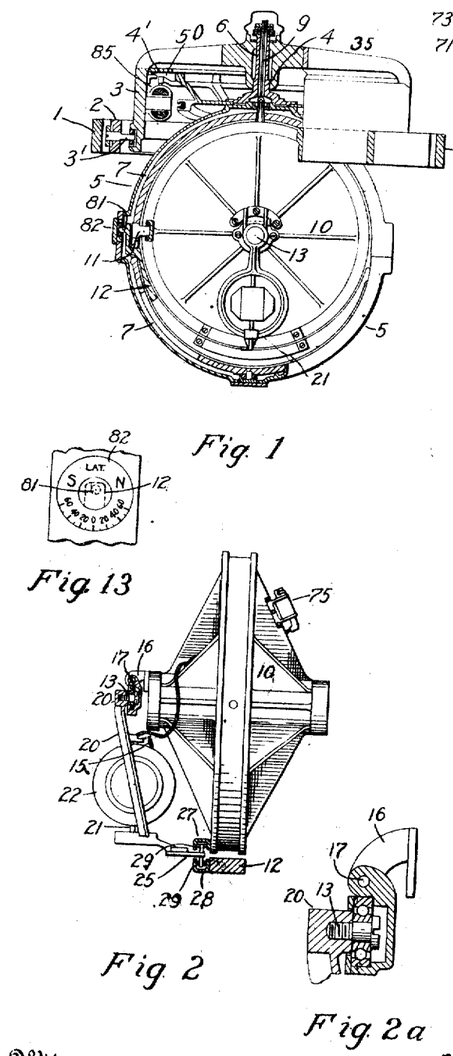

The compass is supplied with a suitable compass card 50, oriented either directly or indirectly by the sensitive element consisting of the vertical ring 7, and parts supported thereby. Figs. 1, 5 and 7. The peculiar method of guiding and supporting this sensitive member by phantom 5 in Fig. 1 has been described in detail in the previous application referred to and its guidance in Figs. 5 and 6 is similar thereto, but the frame 5' is preferably rigid with the spider 3 and a mercury float 47—44 is here employed in lieu of the filament 9 and follow up system of Fig. 1. This frame 7 is coupled to the float 47 by the tube 9'. The compass card 50 operates with the float 47. The sensitive element is equally free to orient in Figs. 1, 2, 5 and 6.

The sensitive element consists of a spinning gyro wheel located within a frame or casing 10, which is horizontally pivoted at 11 to the support 7.

The main pendulum or bail 12 is pivoted to the rotating bearing 82 of the phantom 5 passing through the ring 7 in Fig. 1, and in Fig. 5 it is pivoted to the ring 7 by means of the frame 51.

As explained in said Sperry application, use is made of the pendulum to accomplish several important and distinct results. Firstly, the pendulum serves to increase the ballistic properties of the rotor and its casing 10 about the pivots 11, since as in this type preferably but a small or even no pendulous factor is imparted directly to the casing 10. Secondly, the pendulum serves to suppress the oscillations of the compass about the meridian. We have added several functions for the pendulum, among which are, first, to prevent the effective center of pendulousness, or apparent center of gravity of the gyro-compass from departing from its proper relation to the center of gravity of the gyroscope during oscillations thereof, and second, to enable a latitude correction to be applied to the compass in order to maintain its horizontal in all latitudes. The last named result is accomplished by providing means by which the relative position of the pivotal axes of pendulum 12 and casing 10 is shifted laterally.

The preferred form of adjustable pivot for the bail is illustrated in Figs. 1 and 13, by means of which it may be better suited to different latitudes by moving the eccentric pivot 81 one way or the other.

For purposes of holding the point of application of the pendulum element in its fixed relation to the vertical below the center of gravity of the wheel casing, different methods may be used, two only of which we have shown herewith; first, by leaving the pendulum in a fixed relation to the casing with a movable point of contact engaging each and moving in the east-west plane, see Figs. 1 to 4; and secondly, by providing the pendulum with a rigid contact and pivoting it so that the whole ballistic may move in an east-west plane, the contact moving in relation to the casing, see Figs. 5 to 10. The result being the same in either case, the structures are full operative equivalents, and we have found that the same means may be employed to damp out oscillations and stabilize and hold this point rigidly in space as the more massive parts are allowed perfect freedom in their natural movements. The details of these devices are as follows:

In all the figures the casing 10, containing the spinning wheel is supported on the vertical ring 7 by horizontal pivots 11; opposite and in line (in their mean position) with these pivots on either side are the pivots 81 of the pendulum or bail 12, which imparts to the gyroscope in the embodiment shown most of its ballistic properties. It will, of course, be understood that according to my invention the said pendulum may only impart to the gyroscope a portion of its ballistic properties, the remaining portion being obtained by making the casing more or less pendulous about its horizontal pivot axis 11. In Figs. 1-4 the point of attachment between the pendulum and the casing consists of a member 25, above and below which are rigid pins supporting the rollers 29—29, one engaging the casing 10 and the other the bail 12. These rollers pass freely in the plane of the casing in the troughs 27 and 28, one being mounted on each pin. Thus they are rigidly engaged, but the point of engagement may move freely in the east-west plane, to facilitate which the member 25 is caused to move in an arc coincident with the troughs 27—28 about a pivot 13 at the upper end of an arm 20 encircling a small gyro 22. The pivot 13, which is preferably substantially coaxial with the spinning axis of the gyrorotor or parallel thereto, is rendered free on pin 17 and supported on the casing 10 by bracket 16. The gyro 22 is mounted within the arm 20 upon the vertical pivots 21 and is supplied with a little vertical centralizing spring 15 which tends to constantly return the little gyro to the position indicated. This gyro performs the simple function of a passive stabilizer for the connection on arm 20 about the axis 13.

It should be observed that the gyroscope 22 and its supporting frame constitute in effect a pendulum of long period which will of itself impart more or less ballistic property to casing 10 about axes 11 to supplement the pendulum 12. Since this pendulum will always hang vertical in a plane perpendicular to axis 11—11, and is fixed to move with the gyro by couplings 17 and 29 about said axis, its action on the compass during oscillations will remain the same as the action of the pendulum 12 acting through the connection 29 above described. By positioning gyroscope 22 with its spinning axis normally parallel to axis 11—11, the period of this auxiliary pendulum is lengthened only about the horizontal axis perpendicular to axis 11—11 the pendulum remaining a simple pendulum about axis 11—11 or in other words, about pin 17, so that it will aid or at least not retard the ballistic action of bail 12.

Figure 3:
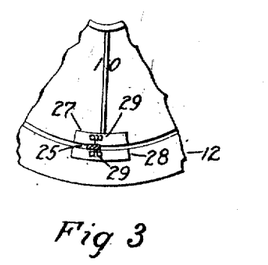
Fig. 3 is a detail view.
Figure 4:
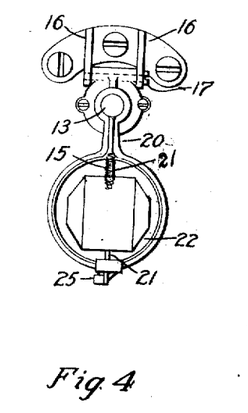
Fig. 4 is an elevation of the stabilizing gyro and its supporting connections.

Referring now to Figs. 5-10, we at once recognize the pendulum 12, pivoted at 81, to a frame 51, but in this case it is also pivoted again at 13 by the frame 51 being pivoted to the arms 7, as shown. In this instance the casing is relieved of supporting any of the parts and the vertical pivot is at Cardan's point, which is at the intersection of pivots 81 and 13, which it will again be seen lies in the plane of the spinning axis, as in Figs. 1-4. With this construction there need be but one roller 29, shown in Figs. 5, 6, 8 and 10, as this rolls between the side flanges 57 of the casing 10 and thus serves as the point of contact between the bail and casing. This permits the stabilizing gyro 22 to be mounted directly within the pendulum, it being supplied with pivots 21 and the centralizing spring 15, plainly shown in the Figs. 5-10. Where the float 47 is employed as a support, instead of the follow-up system 85 in Fig. 1, damping means operating directly about the horizontal axis may be employed instead of the positive orientation principle acting about the vertical axis, consisting in the offset position of rollers 29, as shown in Fig. 3. This consists in introducing a yielding connection 61 between the ballistic and the casing shown in Figs. 6, 7 and 8. A simple device for carrying out this method consists of the little swinging frame 20, suitably pivoted, which performs a two-fold function, carries the roller 29 engaging the casing and a dash pot shown in detail in Fig. 7, located between pendulum 12 and frame 20. We have found that the ballistic thus applied is the sum of the ballistic of the pendulum 12 and frame 20, when the yielding dash pot 61 is so constructed as to allow only an extremely slow movement even under heavy pressures. Under these conditions it will be seen that parts 12 and 20 act as a unit for all short oscillations. Oscillations of extremely long periods, however, allow them to work with reference to each other, constituting an effective means for damping long period oscillations by applying forces directly about the horizontal supporting axis 11 of the casing 10.

This dash pot is illustrated in Fig. 7 and consists of a casing 61 secured to the outer bail 12, being designed to hold oil or a like substance within which is submerged a double piston 62, each end of which is hollow as shown at 63 and 64. The specific gravity of the piston is unity with reference to the submerging oil. A reduced portion 67 connects the piston 62—62' and said portion provides a rigid attachment to the frame 20 by member 69.

The frame 51 may be provided with counterweights 52 to lessen the duty of the gyro stabilizer 22 about the pivots 13. The weights 52 also serve to equalize the moments of inertia of the suspended portions of the apparatus about the two principal horizontal axes. To secure efficiency in a gyro-wheel it is advisable to design it so that it has considerably greater dimensions diametrically than axially. It is also found necessary to make the inclosing casing conform more or less closely to the proportions of the rotor, both in order to dissipate the heat properly and to avoid unnecessary weight. Other parts, including the bail 12, are necessarily proportioned accordingly. By the laws of mechanics, if such an unbalanced body is suspended and oscillated like a pendulum in any plane but a plane parallel to its principal axis, a torque will be exerted on the body tending to turn it into such a plane, and causing it to oscillate until it comes to rest in the plane. As applied to a compass, it will at once be seen that such an effect is very undesirable, since it would cause serious deviations if the compass were oscillated about the Cardan supports in any plane but the plane of the rotor. Weights 52 positioned beyond the general outlines of the disk-shaped casing 10, furnish a ready means of overcoming this defect by equalizing the moments about both horizontal axes.

It will be seen that the roller 29 is guided in the proper arc by the pivot 13 in all the figures and is stabilized against angular motion about this pivot by gyro 22. In the form shown in Figs. 5 to 8, the gyroscope lengthens the period of the entire pendulum 12 about axis 13—13, but allows the pendulum to have a shorter period about axis 81—81, since, as before its spinning axis is normally parallel to axes 81—81 and 11—11.

With alternating current of the same periodicity the self induction of the stator diminishes so rapidly with changes in size that a great saving is effected in electric windings of the stator of the gyroscope 22 by lowering the impressed voltage below that used for the main gyro wheel. This gain is greatly enhanced by avoiding the heavy insulation in and about the minute slots as well as at numerous other points in small stators. Multiplicity of contacts leading into the sensitive element is also very undesirable. The method of solving all these problems simultaneously has been found by introducing a small alternating current stepdown transformer upon the sensitive element which supplies the stator of the small gyro or gyros and having its primary coupled directly to the orienting contacts which supply the main gyro below the same.

A source of alternating current passes through suitable orienting contacts and reaches conductors 70, 71 and 72; connected to the motor 73 located within the main casing 10 in the sensitive element. In a derived circuit tapping these leads is a stepdown transformer 75 used to reduce the potential which supplies the auxiliary gyro 22, indicated at 77. The motors of the two gyros are therefore coupled in multiple. This transformer and terminal block 74 are preferably attached upon some point of the sensitive element, as for instance on the wheel casing 10. By positioning the transformer on the opposite side of the casing 10 from the gyroscope 22 and also above the horizontal axes 11, the weight of pendulous device 22 may be partially or wholly counterbalanced about either the horizontal or vertical axes, or both, as desired. The connection between transformer 75 and motor 77 is made by a flexible cable, as shown in Fig. 2.

In the application of the gyro-compass to moving vehicles, such as ships, difficulties of a serious nature are encountered owing in particular to disturbing influences being created by angular movements of the ship relatively to adjacent stationary objects and to angular movements about a diameter of the earth incidental to change of latitude. The direction which the axle of a gyro-wheel takes up is dependent upon the resultant of the various angular velocities with which it is influenced. If the gyro compass is being carried by, say, a ship, in a true east-or west direction, the angular motion of the ship upon the surface of the earth takes place about the axis of rotation of the earth itself and no disturbing factor is therefore introduced. It will, however, be understood that if the ship is not traveling in a true east or west direction, it has an angular velocity about a diameter of the earth inclined to the axis of rotation of the earth. For example, every point on the equator moves in space, owing to the diurnal rotation of the earth, at a linear velocity of about a thousand miles per hour and with an angular velocity of one rotation per day about the axis of rotation of the earth; if a ship carrying the gyro compass could travel in a north or south direction at this same speed, a disturbing factor would be introduced equal in effect to that due to the rotation of the earth but exerting its effect in a plane perpendicular to that due to the earth's rotation. From this it is evident that the speed of a ship traveling in a north or south direction or in a direction having a northerly or southerly course component causes a disturbing influence to be exerted upon the directional force of the gyro compass. Variation in the speed of the ship introduces, of course, variation in the resultant effect of this disturbance.

The directive power of the compass is due to its rotation as a whole about the earth's axis, as is understood; hence whenever the velocity of ship has a meridianal course component, the axis of the gyro-wheel is shifted through a certain angle C, say, where $$\tan C = \frac{K \cos H}{E \cos L} = C \text{ (the angle being small)}$$

where

K = linear speed of ship in knots;
H = angle in degrees of ship's heading or course from the true geographical north; and
E cos L = easterly linear velocity of earth at latitude L, where E represents the linear velocity of a point on the equator.

Figure 15:
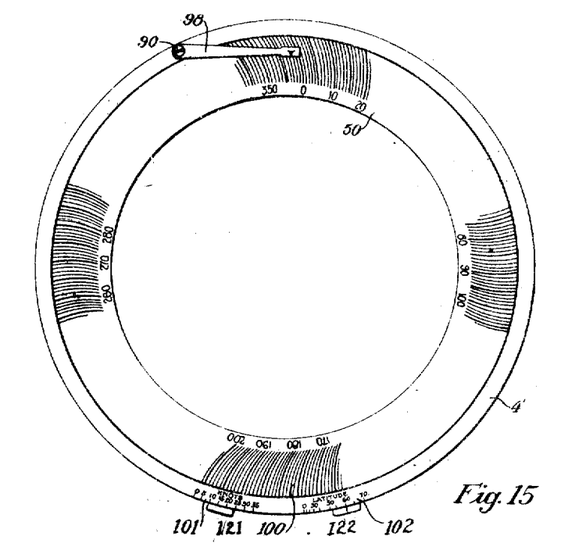
Fig. 15 is a plan view of the correction device used to automatically apply certain necessary corrections to the compass readings.
Figure 16:
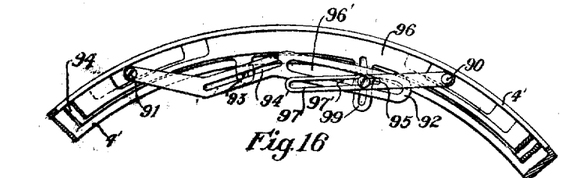
Fig. 16 is a bottom plan view of the levers for applying this correction.
Figure 17:
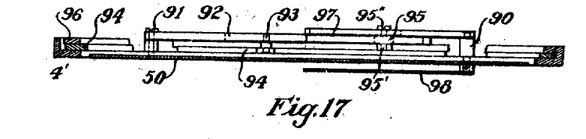
Fig. 17 is an elevation of the same.

Briefly summarized, there are three variables which affect the reading of the compass, the course of the ship, the speed of the ship and its latitude, any one or all of which may be corrected for. While portions only of our invention may be employed, we prefer to correct for all three variables by providing the compass card with a predetermined character of markings which are laid out with reference to an index adapted to be moved across the compass card so as to introduce the proper correction for the heading of the ship when read on said index without the necessity of shifting the index for said purpose, the transverse position of the said index being set for any given speed and latitude. For this purpose we locate under the lubber ring 4' two rings 94 and 96, one of which is for the purpose of applying the speed correction to the adjustable index, while the other compensates for different latitudes. Lubber ring 4' carries a pin 91 on which a slotted lever 92 is pivoted. The ring 94 carries a pin 93 which slides in the slot 94' of the lever 92. The ring 96 has a slotted projection 99 in which the pin 95' mounted in the crosshead 95 is adapted to slide. Crosshead 95 is located in the slot 96' of lever 92 and is therefore confined thereby. Said crosshead is further provided with a pin 95" which slides in a slot 97' of the lever 97. This lever serves to rotate the index pointer 98, both the lever and pointer being pivoted to the lubber ring 4' by being secured to a common rotatable pin 90. The crosshead 95 moved by the action of either or both of rings 94 and 96 delivers the algebraic product (or quotient) of said motions to the lever 97 and pointer 98.

Finger pieces 121 and 122 are provided to adjust the positions of rings 94 and 96 respectively, the former introducing the correction for speed and the latter for the latitude of the ship. Preferably suitable indications 101, 102 are provided for adjusting the finger pieces to aid in setting them to the proper position.

It will at once be seen that by calculating the angles and contours of the three slots 94', 96' and 97' the pointer 98 may be moved across the compass card to a predetermined position depending upon the setting of finger pieces 121 and 122, or in other words, depending upon the speed and latitude of the ship. The compass card itself is provided with peculiar or special markings 100, which extend in a general radial direction, but are laid out so as to automatically introduce the required correction for the ship's heading. In other words, these peculiar markings render unnecessary the introduction of an additional correction to the shiftable index to correct for the heading of the ship. The explanation of these markings can be best made by supposing that the pointer 19 were moved exactly radially across the card index, instead of being pivoted about axis 90. In such case, the marking at 90° and 270° would be straight radial lines, since at these points the ship is heading due east or west, so that no correction is introduced, while at all other points the line is inclined at such an angle to the true radius as to introduce the proper correction for such heading when the pointer is moved radially by the adjustment of finger pieces 121 and 122. In other words, this angle is laid out to satisfy the equation $$C = \frac{K \cos H}{E \cos L},$$

so that it is a function of the cosine of the ship's heading (H) in azimuth. Since the pointer is rotated according to the modification disclosed about point 90, the lines are curved instead of straight. For each position of the index the markings are expanded circumferentially from the E.-W. to the N. S. lines in accordance with the indicated speed and latitude.

In gyro compasses where the wheel is possessed of three degrees of freedom with the second degree (horizontal axis) partially suppressed or given the requisite ballistic property, movements about the second degree axis are always accompanied by movements about the third degree axis and vice versa. So when a wheel is spinning with its axis out of the plane of the meridian a tilting takes place about the horizontal axis which acting against the restraint of the pendulum produces precession which causes orientation of the wheel toward the meridian. The directive forces being zero when on the meridian the above movement is carried on across the meridian, whereupon it is arrested by opposite forces, which finally reverse it and start it again toward the meridian, which it again crosses, and thus oscillations are set up which would be continuous were it not for the presence of certain damping factors.

In a navigation apparatus this damping factor must be of greater magnitude than where compasses are to be employed upon land, where the friction of the pivots are sufficient for this purpose. Damping by partial or complete submerging of the orienting element is completely effective and is well known in the art. This serves every purpose where the ballistic properties are inherent in the wheel frame or support. But where the ballistic properties are in whole or in part independent of this support new opportunities are at once afforded to secure damping by methods primary, as distinguished from introducing outside and secondary forces for this purpose.

In case of the independent pendulum, the simple offset of the point of contact between the pendulum and the wheel frame or casing has been found to act as an effective damper by primarily opposing oscillations. This has been thoroughly described in this art and a new arrangement of same has been shown and described herein.

An alternative method has also been described herein which consists of the restraining element 61, located between the independent pendulum and the wheel casing, the action of which has been completely described and the function of which in suppressing oscillations has now been pointed out. This operates as primarily opposing the oscillations about the horizontal axis, which is found to be equally effective in point of damping to the system of operation where the forces are introduced about the vertical axis.

The suppression of the second degree of freedom by the independent pendulum is through the movable connection which imparts to the system a floating or movable apparent center of gravity or effective ballistic center. During oscillations of the sensitive element the point of application of the pendulum to the wheel casing must constantly change its angle with reference to the center of gravity of the gyro to be most effective in suppressing disturbances due to oscillations, and especially oscillations in inter-Cardan planes, this point of contact should remain in space with an invariable relation to the vertical projected downwardly from the center of gravity of the wheel casing. This is accomplished by suppressing individual oscillations of the frame 20, or system controlling the position of the roller or rollers 29, which constitute the point of contact between the pendulum and the casing.

There are many ways in which these vibrations may be damped or suppressed. The method shown herein is by the small stabilizing gyro 22 which vigorously opposes angular motions about the pivot 13 and compels maintenance and persistence of the vertical relation mentioned against the most vigorous vibrations, oscillations and angular movements reaching these parts from the ship.

Of course it is understood that the gimbal or Cardan support 2 aids in suppressing some of the motion from the ship.

The presence of the weights 52, while not disturbing the ballistic qualities of the pendulum 12 and its attached parts, effectively reduce the total ballistic properties about the pivots 13, against which the gyro 22 must perform its stabilizing function and reduce it to a point where a small gyro, running at comparatively low speed, is found to easily function.

The spinning of the gyro-compass wheel and also the stabilizer wheel by polyphase current is well known and apparent.

The necessity for the correction scale described herein arises from the fact that upon northerly or southerly courses persistent and consistent deflection from the true meridian takes place which is proportional to the speed and cosine of the angle between the course and the meridian and inversely proportional to the cosine of the latitude.

The structure illustrated is such that the proper function of the latitude is introduced into the moving pointer 98 by the correlation of the shape of the cam slot and the latitude divisions upon the scale.

Similarly the proper function of the speed is introduced by another cam slot which, owing to its exact shape, coöperates with the divisions on the scale of speed and knots. Both of the above inter-relations have been described and coöperate to locate the pointer to such a radial position upon the scale that the reading with proper correction is secured, the final correction factor being introduced by the peculiar curvature, which has been mathematically determined for each division of the scale. The heading component of the formula is thus produced by the apparent orientation of the compass itself.

The adjustable mounting of the bail 12 as above pointed out is for the purpose of adding weight to the north or south side of the horizontal axis of the gyro so that the requisite torque for a given latitude is exerted on the element to cause a precession about the vertical axis equal to the component, which varies as the sine of the latitude, of the earth's rotation about the same vertical axis at this latitude.

In accordance with the provisions of the patent statutes, we have herein described the principle of operation of our invention, together with the apparatus, which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim as new and desire to secure by Letters Patent therefor, is:

1. In a gyro-compass, a rotor bearing frame, means for mounting said frame so as to be free to turn about a vertical axis and for oscillation about a horizontal axis, a pendulum mounted independently of said frame, and a coupling between said pendulum and frame which is movable with respect to said frame in a plane substantially parallel to the plane of rotation of the rotor.

2. In a gyro-compass, a rotor bearing frame, means for mounting said frame to swing about an axis substantially parallel to said horizontal axis so as to be free to turn about a vertical axis and for oscillation about a horizontal axis, a pendulum mounted independently of said frame, a coupling between said pendulum and frame which is movable with respect to said frame in a plane substantially parallel to the plane of rotation of the rotor, and means for maintaining said coupling in a predetermined relation to a vertical plane through the rotor bearings.

3. In a gyro-compass, a rotor bearing frame, means for mounting said frame so as to be free to turn about a vertical axis and for oscillation about a horizontal axis, a pendulum mounted independently of said frame, a coupling between said pendulum and frame which is movable with respect to said frame in a plane substantially parallel to the plane of rotation of the rotor, and means for maintaining said coupling in a predetermined relation to a vertical plane through the rotor bearings, such that the apparent center of gravity or ballistic center of the gyro-compass is prevented from departing from its proper relation to said vertical plane during oscillations of the compass.

4. In a gyro-compass, a rotor bearing frame, means for mounting said frame so as to be free to turn about a vertical axis and for oscillation about a horizontal axis, a pendulum mounted independently of said frame, a coupling between said pendulum and frame which is movable with respect to said frame in a plane substantially parallel to the plane of rotation of the rotor and an auxiliary gyroscope for maintaining said coupling in a predetermined relation to a vertical plane through the rotor bearings.

5. In a gyro-compass, a rotor bearing frame, means for mounting said frame so as to be free to turn about a vertical axis and for oscillation about a horizontal axis, a pendulum mounted independently of said frame, a coupling between said pendulum and frame which is movable with respect to said frame in a plane substantially parallel to the plane of rotation of the rotor and means for suppressing individual vibrations or oscillations of said coupling.

6. In a gyro-compass, a rotor bearing frame, means for mounting said frame so as to be free about the vertical axis and for oscillation about a horizontal axis, and a pendulum connected to said frame so as to increase the ballistic properties thereof about the said horizontal axis of support the point of application of the pendulum being free to remain in the same vertical plane with respect to the spinning axis of the rotor irrespective of oscillations of the gyroscope about said spinning axis.

7. In a gyro-compass, a rotor bearing frame, means for mounting said frame so as to be free to turn about the vertical axis and for oscillation about a horizontal axis, a pendulum mounted independently of said frame and an eccentric coupling between said pendulum and frame which is movable with respect to said frame in a plane substantially parallel to the plane of the rotor.

8. In a gyro-compass, a rotor and rotor casing pivotally supported in indifferent or static equilibrium about a horizontal axis, a pendulous mass supported adjacent said rotor casing, a movable connection between said mass and casing and means for stabilizing the point of contact between said connection and casing.

9. In a gyro-compass, a rotor and rotor casing pivotally supported about a horizontal axis, a pendulous mass supported adjacent said rotor casing, an auxiliary gyroscope pendulously supported from one side of said casing, and a transformer for reducing the voltage for said gyroscope mounted on the opposite side of said casing, said gyroscope forming a connection between said mass and said casing.

10. In a gyro-navigational instrument, a rotor and rotor bearing frame mounted for free turning about the vertical axis and for oscillation about a horizontal axis, a pendulum having a mounting independent of said frame for increasing the ballistic properties of said frame and means whereby the relative position of the ballistic center of said pendulum and of the rotor and frame may be adjusted to compensate for changes in latitude.

11. In a gyro-navigational instrument, a rotor and rotor bearing frame mounted for free turning about the vertical axis and for oscillation about a horizontal axis, a pendulum having a mounting independent of said frame for increasing the ballistic properties of said frame and means whereby the relative position of the ballistic center of said pendulum and of the rotor and frame may be adjusted to compensate for changes in latitude, said means including an eccentrically mounted pivot secured to said pendulum.

12. In a gyro navigational compass, a support, a bearing therein, a pendulum, and a pivot secured to said pendulum and eccentrically mounted in said bearing.

13. In a gyro-compass, a rotor and a rotor casing pivotally supported about a horizontal axis, a pendulous mass supported adjacent said rotor casing, an auxiliary gyroscope pendulously supported by said casing, said gyroscope serving as a floating connection between said mass and casing.

14. In a gyro-compass, a rotor and a rotor casing pivotally supported about a horizontal axis, a pendulous mass supported adjacent said rotor casing, a second pendulous member supported by said casing, said member serving as a floating connection between said mass and said casing.

15. In a gyro-compass, a rotor and a rotor casing pivotally supported about a horizontal axis, a pendulous mass supported adjacent said rotor casing, an auxiliary gyroscope pendulously supported by said casing, said gyroscope serving as a floating connection between said pendulum and said casing, whereby the distance of the point of connection from a vertical plane through the point of support of said member is maintained substantially constant.

16. In a gyro-navigational instrument, a rotor and rotor bearing frame mounted for free turning about the vertical axis and for oscillation about a horizontal axis, a pendulum having a mounting independent of said frame whereby it may swing about an axis substantially parallel with said horizontal axis for increasing the ballistic properties of said frame and means whereby the relative position of the ballistic center of said pendulum and of the rotor and frame may be adjusted to compensate for changes in latitude, said means including an eccentrically mounted pivot secured to said pendulum.

17. In a gyro-compass, a rotor and rotor bearing frame, means for mounting said frame so as to be free to turn about a vertical axis and for oscillation about a horizontal axis, and a pendulum pivoted to said frame so as to oscillate freely about an axis substantially perpendicular to said horizontal axis but connected to move with the frame about said axis.

18. In a gyro-compass, a rotor and rotor bearing frame, means for mounting said frame so as to be free to turn about a vertical axis and for oscillation about a horizontal axis, a pendulum pivoted to said frame so as to oscillate freely about an axis substantially perpendicular to said horizontal axis but connected to move with the frame about said axis, and an auxiliary gyroscope connected with said pendulum to stabilize it about its axis of oscillation.

19. In a gyro-compass, a rotor and rotor bearing frame, means for mounting said frame so as to be free to turn about a vertical axis and for oscillation about a horizontal axis, a pendulum pivoted to said frame so as to oscillate freely about an axis substantially perpendicular to said horizontal axis but connected to move with the frame about said axis, a gyroscope mounted on said pendulum upon a vertical precession and horizontal spinning axis and centralizing means extending between the gyroscope and pendulum.

20. In a gyro-compass, a rotor and rotor bearing frame, means for mounting said frame so as to be free to turn about a vertical axis and for oscillation about a horizontal axis, a pendulous device, a universal coupling pivotally connected to said device adjacent its top to said frame, and a floating connection between said device and frame at a point removed from said coupling, which is movable with respect to the frame in a plane containing said connection and said horizontal axis.

21. In a gyro-compass, a rotor and rotor bearing frame, means for mounting said frame so as to be free to turn about a vertical axis and for oscillation about a horizontal axis, a pendulum mounted adjacent but independently of said frame, a second pendulum pivoted to said frame so as to oscillate freely and a floating connection between said first and second pendulums and said frame which rigidly couples said members for oscillation about said horizontal axis, but permits freedom of oscillation about the other horizontal axis.

22. In a gyro-compass, a rotor bearing frame, means for mounting said frame so as to be free to turn about a vertical axis and for oscillation about a horizontal axis, a pendulum mounted independently of said frame, and a coupling between said pendulum and frame which is movable with respect to said frame in a plane containing said coupling and said horizontal axis.

23. In a gyro-compass a rotor bearing frame, means for mounting said frame so as to be free to turn about a vertical axis and for oscillation about a horizontal axis, a pendulum mounted independently of said frame, a coupling between said pendulum and frame which is movable with respect to said frame in a plane containing said coupling and said horizontal axis and a pendulous device for supporting said coupling whereby it may move only in said plane and will maintain a predetermined relation to a vertical plane passing through a point of said frame on said horizontal axis.

24. In a gyro-compass, a self-orienting sensitive element, a compass card having correction curves marked thereon and carried by said element, a relatively stationary ring, an azimuth indicating pointer pivoted thereto, and means for adjusting the pointer to coöperate with said card for indicating the true azimuth.

25. In a gyro-compass, a self-orienting sensitive element, a compass card carried thereby and having correction curves marked thereon, a relatively stationary ring, an azimuth indicating pointer pivoted thereto, and a lever mechanism for adjusting the pointer to coöperate with said card and indicate the true azimuth.

26. In a gyro compass for ships the combination with an azimuth indicating element and a relatively fixed element, coöperating indicating means on said two elements, one of said means being in the form of a graduated circle having the graduations circumferentially spaced to correct for errors due to the ship's heading for a predetermined speed and latitude.

27. In a gyro compass for ships, the combination with an azimuth indicating element and a relatively fixed element, coöperating indicating means on said two elements, one of said means being in the form of a graduated card having graduations inclined at varying angles to the true radii which angles are functions of the azimuth readings on the card, and means for moving said other indicating means transversely to the scale of graduations on the first means in accordance with the speed and latitude.

28. In a gyro compass for ships, the combination with a reference index, of a compass card provided with direction indicating graduations which are circumferentially spaced to correct for errors due to the ship's heading for a predetermined speed and latitude.

29. In a gyro compass, a card provided with scale graduations, the adjacent ones of which are variously inclined at predetermined angles which are a function of the angle in azimuth which they indicate and an index for said card adjustable across the card.

30. A correction device for gyro-compasses comprising a rotatable card having a plurality of markings thereon, an index adjustable across said card, means for thus adjusting the index with reference to the speed and latitude of the ship, said markings being laid out on said card so as to introduce the proper correction for the ship's heading.

31. A correction device for gyro compass comprising a rotatable card having a plurality of markings thereon, a rotatable index adapted to be swung across said card, means for setting the index with reference to the speed and latitude of the ship, said markings being laid out on said card so as to introduce the proper correction for the ship's heading.

32. A correction device for gyro-compasses comprising a rotatable card having a plurality of markings thereon, an index adjustable across said card, means for thus adjusting the index with reference to the speed of the ship, said markings being laid out on said card so as to introduce the proper correction for the ship's heading.

33. A correction device for gyro-compasses comprising a rotatable card having a plurality of markings thereon, an index adjustable across said card, means for thus adjusting the index with reference to the latitude of the ship, said markings being laid out on said card so as to introduce the proper correction for the ship's heading.

In testimony whereof we affix our signatures in presence of two witnesses.

HANNIBAL C. FORD.
HARRY L. TANNER.

Witnesses:
ALBERT W. STRINGHAM,
LEONARD J. DIBBLE.